Herzog & Roth,
Manf. Ornamental Wood Work.
No. 87,672. Patented Mar. 9, 1869.

Witnesses;
Phil G. Larner
Wm D. Jones

Inventors;
August Herzog
John G. Roth
by J. Fraser & Co.
Attys.

UNITED STATES PATENT OFFICE.

AUGUST HERZOG AND JOHN G. ROTH, OF NEW YORK, N. Y., ASSIGNORS TO AMERICAN ORNAMENTAL WOOD MANUFACTURING COMPANY, OF THE SAME PLACE.

MATERIAL FOR THE MANUFACTURE OF CABINET AND OTHER WORK IN WOOD.

Specification forming part of Letters Patent No. 87,672, dated March 9, 1869.

*To all whom it may concern:*

Be it known that we, AUGUST HERZOG, a citizen of Bavaria, now residing in the city of New York, and JOHN G. ROTH, also of New York, have invented a new and Improved Material for the Manufacture of Cabinet and other Ornamental Work in Wood; and we do hereby declare that the following is a full and exact description thereof, reference being had to the accompanying drawings, representing specimens of the same.

Our invention consists of a new material for the manufacture of cabinet-wares and ornamental work in wood, and said material is produced by uniting together thin longitudinal sections or layers of veneers of diverse and contrasting colors, said layers being parallel, and forming diversified and agreeable ornamental figures by the gradations produced by the working of irregular forms upon the surface; or, when the surface is to be finished plane, producing a like appearance by varying the direction of the layers which compose the material.

Figure 1:
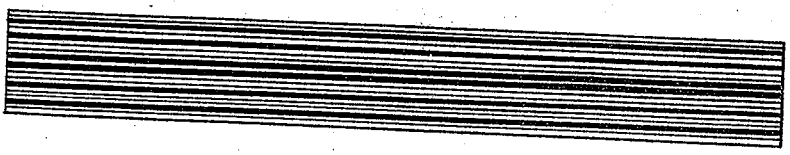

In preparing the material, we take veneers of two or more kinds, the color and appearance of which are different, as rosewood and satin or other light-colored wood, or black walnut and white-wood, and unite them firmly together with glue or other suitable cement until a plank or board of sufficient thickness has been formed, as in Fig. 1.

The layers thus joined are alternated, so as to produce a contrast of color, on which the pleasing effect of our invention depends.

Several varieties of veneers may be joined in the same piece, as ebony, mahogany, and white-wood, and by varying their order of arrangement exceedingly pleasing effects may be produced when finished in furniture or other wares.

Figure 2:
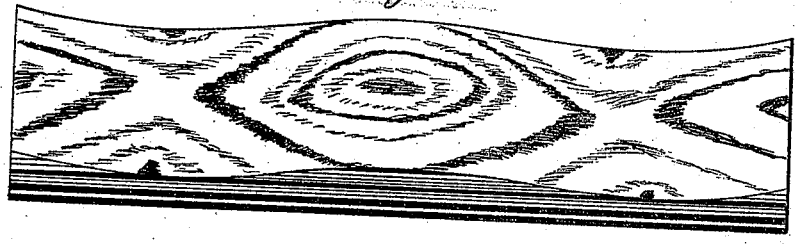

Planks or boards so formed may be wrought into any kind of cabinet-work or furniture, in most of which there is sufficient irregularity of surface when finished to exhibit several sections of the different kinds of wood, especially in turned work, in moldings, raised panels, swelled-front drawers, and carved work generally, as seen in Fig. 2.

Figure 3:
Figure 4:

The figures developed by the working of the wood are extremely diversified, and where woods of strongly-contrasted colors are employed very striking effects are produced.

Where the work when finished is to present a plane surface, as in table-tops and similar articles, we form our material by either imparting a series of curves or waves to the layers, Figs. 3 and 4, or by giving one general curve or inclination to them, so that when worked flat a succession of the layers will be exposed upon the surfaces, and thus produce the ornamental effect desired.

Simply working a piece formed of plain layers in a direction oblique to the plane of the layers produces an effect sufficiently varied to be ornamental, and by a suitable distribution of the different kinds of wood, of agreeably-contrasting colors and texture, very beautiful and striking effects may be produced, and in a manner far more durable and substantial than inlaid or mosaic work in wood, for the reason that our improved material, being composed of parallel longitudinal layers of veneers, resembles the structure of natural wood, and possesses equal or greater strength in all directions, whereas the former kinds of work are made up of numerous fragmentary pieces of various and irregular forms at the sacrifice of strength.

Our material also possesses the important advantage of having throughout its entire structure the conditions on which the surface ornamentation depends, instead of the same being merely a thin superficial layer, and thus enables objects of any desired shape to be produced by carving, turning, or other means; and it is the special design of our invention to furnish a species of composite lumber of a rich and ornamental character, made up of various species of veneers, as a new article of manufacture and commerce. Such a manufacture utilizes much valuable material in the shape of waste pieces of costly veneers, that would otherwise be lost.

The effect may be varied by interposing layers of other material, as ivory, bone, sheet metal, or foil, between the layers of wood for particular kinds of ornamental work.

Furniture made from this material is not liable to warp and change in variations of temperature and humidity, as that made of ordinary wood.

The material is not expensive, it requiring but little labor to make it by suitable machinery, and refuse lumber, as well as small pieces which would otherwise be wasted, can be used.

What we claim as our invention, and desire to secure by Letters Patent, is—

The within-described article of wood, the same formed by the union of a series of veneers parallel to each other, and of diverse colors, in the manner and for the purpose set forth.

In witness whereof we have hereunto signed our names in the presence of two subscribing witnesses.

AUGUST HERZOG.
JOHN G. ROTH.

Witnesses:
KATE N. JONES,
J. FRASER.